United States Patent [19]
Tan et al.

[11] Patent Number: 6,075,576
[45] Date of Patent: Jun. 13, 2000

[54] METHOD FOR DISPLAY TIME STAMPING AND SYNCHRONIZATION OF MULTIPLE VIDEO OBJECT PLANES

[75] Inventors: Thiow Keng Tan; Sheng Mei Shen; Chak Joo Lee, all of Singapore, Singapore

[73] Assignee: Matsushita Electric Industrial Co., Ltd., Osaka, Japan

[21] Appl. No.: 09/011,761
[22] PCT Filed: Jul. 3, 1997
[86] PCT No.: PCT/JP97/02319
   § 371 Date: Feb. 26, 1998
   § 102(e) Date: Feb. 26, 1998
[87] PCT Pub. No.: WO98/02003
   PCT Pub. Date: Jan. 15, 1998

[30] Foreign Application Priority Data
   Jul. 5, 1996 [JP] Japan .................................. 8-176430

[51] Int. Cl.[7] ...................................................... H04N 7/24
[52] U.S. Cl. ....................... 348/845.3; 348/423; 348/512; 348/515
[58] Field of Search ................................. 348/845.3, 423, 348/512, 515; H04N 7/24

[56] References Cited

U.S. PATENT DOCUMENTS

| | | | |
|---|---|---|---|
| 5,430,485 | 7/1995 | Lankford et al. | 348/423 |
| 5,467,139 | 11/1995 | Lankford | 348/423 |
| 5,537,409 | 7/1996 | Moriyama et al. | 348/423 |
| 5,784,422 | 7/1998 | Heermann | 348/512 |
| 5,793,431 | 8/1998 | Blanchard | 348/423 |

FOREIGN PATENT DOCUMENTS

| | | | |
|---|---|---|---|
| 0634870 | 1/1995 | European Pat. Off. | H04N 7/24 |
| 0648056 | 4/1995 | European Pat. Off. | H04N 7/24 |

OTHER PUBLICATIONS

An article by O. Avaro et al., entitled: "The MPEG–4 systems and description languages: A way ahead in audio visual information representation", at pp. 385–431 of Signal Processing. Image Communication, vol. 9, No. 4, May 1997.
An article by A. Knoll, entitled "MSDL: MPEG–4 Systems and Description Languages", at pp. 459,460,462,464, and 465 of Ferneseh und Kinotechnik, vol. 50, No. 8/09, Aug. 1996.

*Primary Examiner*—Howard Britton
*Attorney, Agent, or Firm*—Greenblum & Bernstein, P.L.C.

[57] ABSTRACT

A method of encoding a local time base embedded in the compressed data is disclosed. The local time base is encoded in two parts. The first part has a modulo time base that indicates the specific interval in the reference time base and the second part has a time base increment relative to the reference time. Two forms of time base increment is used to allow for the possibility of different encoding order and displaying order. A mechanism for the synchronization of multiple compressed streams with local time base is also described. A time base offset mechanism is also used to allow finer granularity synchronization of the multiple compressed streams.

8 Claims, 14 Drawing Sheets

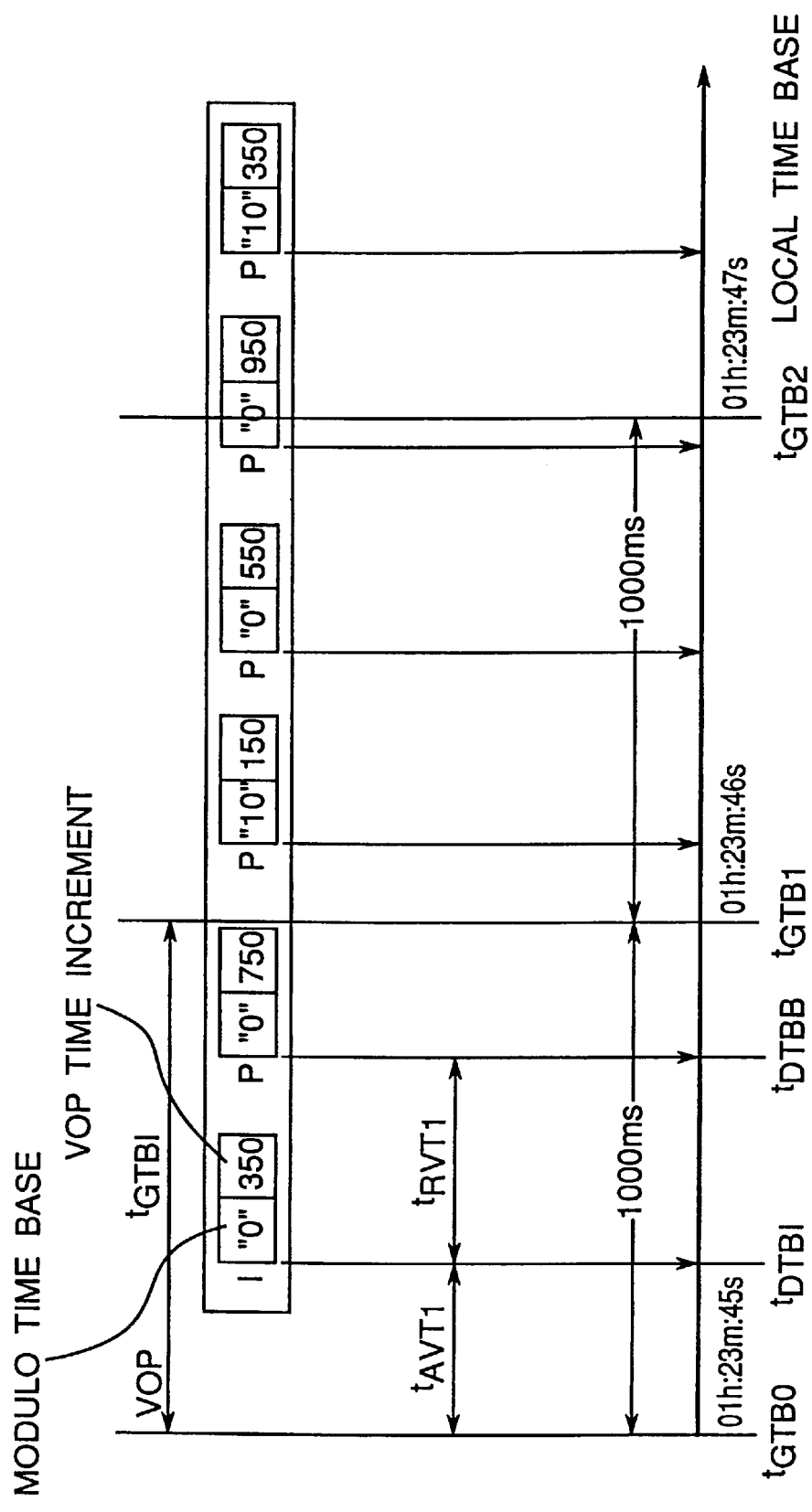

METHOD FOR DISPLAY TIME STAMPING AND SYNCHRONIZATION OF MULTIPLE VIDEO OBJECT PLANES

TECHNICAL FIELD

This invention is useful in the coding of digital audio visual materials where there is a need for synchronizing more than one independently encoded audio visual objects for presentation. It is especially suitable when the temporal sampling of the audio visual material is not the same.

BACKGROUND ART

In MPEG-1 and MPEG-2 the input video consists of image frames sampled at regular time intervals. This represents the finest temporal resolution of the input FIG. 1 shows a video sequence with fixed frame rates where the image frames are sampled at regular intervals. In the coded representation of the video sequence using the MPEG-1 and MPEG-2 standards the display order of the decoded frames is indicated by the temporal reference. This parameter appears at the picture header of the bitstream syntax. The value of this parameter is incremented by one for each decoded frame when examined in the display order.

In the H.263 standard it is possible to skip frames and thus decode a variable frame rate video sequence. However the sampling of frames is still fixed. Thus the temporal reference method used in MPEG-1 and MPEG-2 is still appropriate and only need to be modified such that the increment is not in steps of 1 but in steps of 1 plus the number of non-transmitted pictures at the input frame rate.

Currently work is being done in the area of coding video as separate objects in multiple video object planes. This represents a new dimension in the decoding and synchronization of the respective video objects. It is expected that these different video object planes may come from several sources and can have very different frame rates. Some of the objects may be rendered and have almost continuous temporal sampling rate. These video objects planes are combined into a composite image for display. Therefore some kind of synchronization is required for the composition. It is possible that the display frame rate is different from any of the frame rates of the video object planes. FIG. 2 shows an example of two video object planes having different and varying frame rates compared to one another. Even if a common frame rate can be found between the two video object plane, it is not automatic that this frame rate will be the same as the output frame rate of the compositor.

Hereafter we will refer to the problem in the video domain. However the same principles of this invention can be extended to the audio domain as well as combinations of the two.

From the above it is clear that the current state of the art does not cater for the synchronization of video object planes. The state of the art also does not provide a common temporal reference when the different video object planes have different frame rates which are not multiples of one another.

The first problem is how to provide a common local time base mechanism for each video object plane. This time base will have to be able to provide very fine temporal granularity and at the same time be able to cope with possibility of very long intervals between two successive instances of the video object planes.

The second problem is how to provide a mechanism for synchronizing video object planes having different frame rates.

DISCLOSURE OF INVENTION

The above problems can be solved by implementing a common temporal resolution to be used for all the local time base. In order to cater for the wide range of temporal granularity the local time base is partitioned into two different parts. The first part containing the fine granularity temporal resolution which provide a short time base. The second part contain a coarse granularity temporal resolution which provide a long time base. The short time base is included at each the video object planes to provide temporal reference to the instances of the video objects. The short time base is then synchronized to the longtime base which is common to all the video object planes. It is used to synchronize all the different video object planes to a common time base provided by the master clock.

According to a fist aspect of the present invention, a method of encoding a local time base of an audio visual sequence in the compressed data comprises the steps of:

obtaining instances of the audio visual sequence by temporal sampling;

determining the local time base of the said instances to be encoded into compressed data;

encoding the said local time base in two parts, comprising of a modulo time base that marks the occurrence of a set of time reference spaced evenly at a specific interval on the local time base and a time base increment relative to the said evenly spaced time reference;

inserting the modulo time base into the compressed data whenever the specific interval have elapsed; and inserting the time base increment within the compressed data of the said instances of the audio visual sequence.

According to a second aspect of the invention, a method of encoding a local time base of an audio visual sequence in the compressed data comprises the steps of:

obtaining instances of the audio visual sequence by temporal sampling;

determining the local time base of the said instances to be encoded into compressed data;

encoding the said instances in one of two methods comprising of a first method of compression without reference to any future instances and a second method of compression which refers to the future reconstructed instance;

encoding the said local time base in two parts, comprising of a modulo time base that marks the occurrence of a set of time reference spaced evenly at a specific interval on the local time base and a time base increment.

encoding the time base increment for the instance compressed using the first compression method as an absolute value relative to the said evenly spaced time reference;

encoding the time base increment for the instance compressed using the second compression method as a relative value to the local time base of the previously compressed instance using the said first method;

inserting the modulo time base into the compressed data whenever the specific interval have elapsed; and inserting the time base increment within the compressed data of the said instances of the audio visual sequence.

According to a third aspect of the invention, a method of the first or the second aspect of the invention, wherein a plurality of compressed bitstreams containing local time base information encoded therein are multiplexed, further comprises, for multiplexing, the steps of:

synchronizing the local time base of the individual compressed bitstream to a common time base by encoding and inserting the time base offset in the multiplexed bitstream;

examining each of the compressed bitstream for the next compressed instance to be placed into the multiplexed bitstream until all the compressed bitstreams have arrived at the modulo time base;

inserting a common modulo time base into the multiplex bitstream and skipping the modulo time base of the compressed bitstreams; and repeating the last two steps until all compressed bitstreams are exhausted.

According to a fourth aspect of the invention, a method of the first or the second aspect of the invention, wherein a plurality of compressed bitstreams containing local time base information encoded therein are multiplexed and de-multiplexed, further comprises, for de-multiplexing, the steps of:

decoding the time base offset of the individual compressed bitstream;

examining the multiplexed bitstream for the next compressed instance and placing the said instance into the appropriate compressed bitstream until a modulo time base is encountered in the multiplexed bitstream;

inserting a modulo time base to each of the compressed bitstreams; and repeating the last two steps until the multiplexed bitstream is exhausted.

According to a fifth aspect of the invention, a method of decoding a local time base of an audio visual sequence from the time base of the compressed data encoded, according to the first aspect of the invention, comprises the steps of:

initializing the reference time base taking into account the time base offset;

incrementing the reference time base by a specific interval for each modulo time base decoded;

decoding the time base increment of the compressed instance; and determining the decoding time base of the said instance by adding the said decoded time base increment value to the reference time base.

According to a sixth aspect of the invention, a method of decoding a local time base of an audio visual sequence from the time base of the compressed data encoded, according to the second aspect of the invention, comprises the steps of initializing the reference time base taking into account of the time base offset;

incrementing the reference time base by a specific interval for each modulo time base decoded;

decoding the time base increment of the compressed instance; and determining the time base increment to be one of two types, absolute or relative, depending on the first or second compression method used in the encoding of the instance, respectively;

determining the decoding time base of the said instance by adding the said decoded time base increment value to the reference time base if the time base is of the first type; and determining the decoding time base of the said instance by adding the said decoded time base increment value to the decoding time base of the previous instance encoded using the first compression method, if the time base increment is of the second type.

BRIEF DESCRIPTION OF DRAWINGS

The present invention will become more fully understood from the detailed description given below and the accompanying diagrams wherein:

FIG. 3B illustrates the current invention where the temporal reference of the video objects are indicated by the modulo time base and the VOP time increment. Illustration uses I, P and B VOP.

BEST MODE FOR CARRYING OUT THE INVENTION

This invention operates by providing two forms of synchronization. The first is a short time base attached to the video object plane. Hereafter this time base will be referred to as the VOP time increment. The VOP time increment is the timing mechanism for the video object plane with respect to the long time base which is attached to a group of video object planes to be decoded and composed together. The long time base is referred to as the modulo time base. The VOP time increment and the modulo time based will then be used jointly to determine the actual time base to use for the composition of the video object planes into the final composited sequence for display.

In order to facilitate editing of the bitstream and combining different video object planes from different sources into a new group of video object planes there is a need for a third component to allow a fixed amount of offset between the local time base of the individual video object plane from the common time base. Hereafter this offset will be referred to as the VOP time offset. This prevents the different video object planes from having to synchronize at a granularity equivalent to the modulo time base interval. This component should be kept constant for each video object plane within the group of video object planes that are multiplexed together.

First, the modulo time base is described.

Modulo time base represent the coarse resolution of the local time base. It does not have a value like the VOP time increment. In fact it is more of a synchronization mechanism to synchronize the VOP time increment to the local time base of the video object plane. It is placed in the encoded bitstream as markers to indicate that the VOP time increment of the video object planes that follows are to be reset and that the reference to the local time base are to be incremented by one or more units of the modulo time base interval. In FIGS. 3A, 3B, 4, 5 and 6, the modulo time base is shown as a series of zero or more "1" terminated by a "0" inserted into the bitstream header before the VOP time increment. The number of "1" inserted into the bitstream depends on the number of units of modulo time base that has elapsed since the last code I or P-video object plane. At the encoder and decoder the modulo time base counter is incremented by one for each "1" encountered. Modulo time based counter is finite in length and therefore in a practical system the modulo time base is reset to zero when the maximum value is exhausted. In a typical video sequence, the video object planes form a group of VOP. Therefore the modulo time base is usually reset at the start of this group of VOP.

Next, the VOP time increment is described.

The VOP time increment shall be in units that can support the shortest temporal sampling of the video objects. It can also be the native time base for the object which is rendered. It therefore represents the finest granularity of temporal resolution that is required or can be supported.

Figure 1:
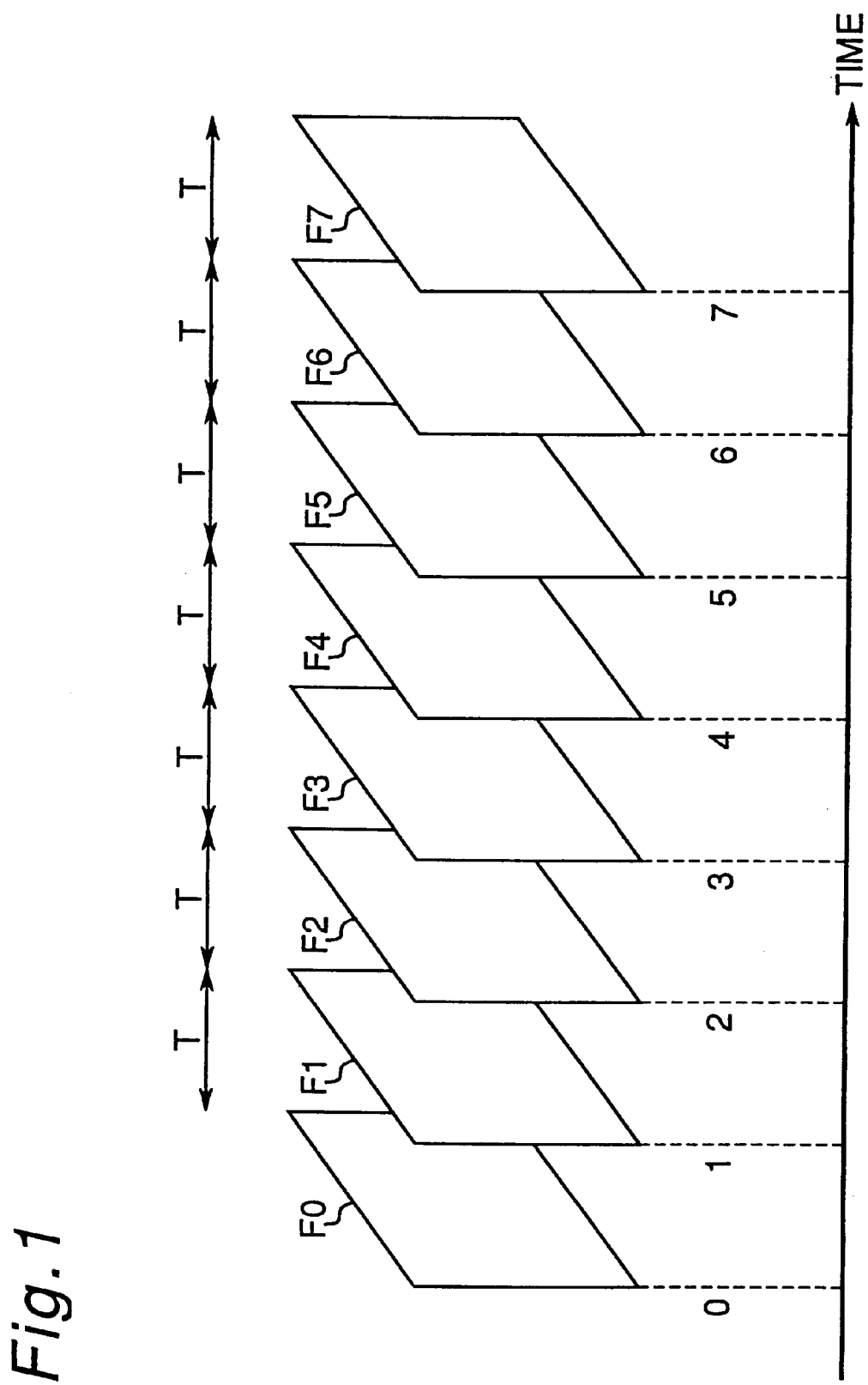
FIG. 1 illustrates the temporal sampling of the prior art where the frames of the video sequence is sampled at regular intervals.
Figure 2:
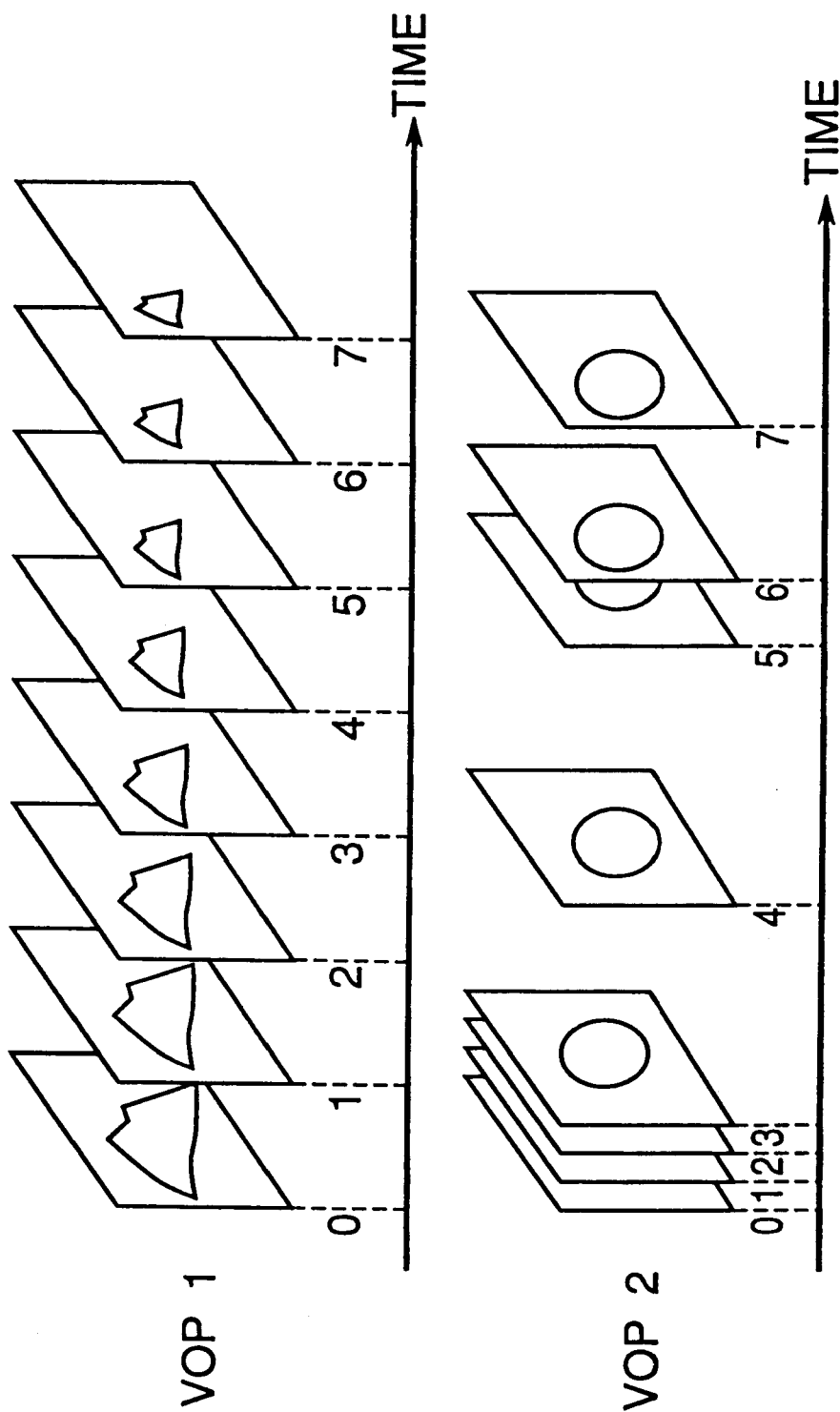
FIG. 2 illustrates the concept of video object planes and the relationship with one another. The sampling of the video object planes can be irregular and the sampling period can vary drastically.
Figure 3A:
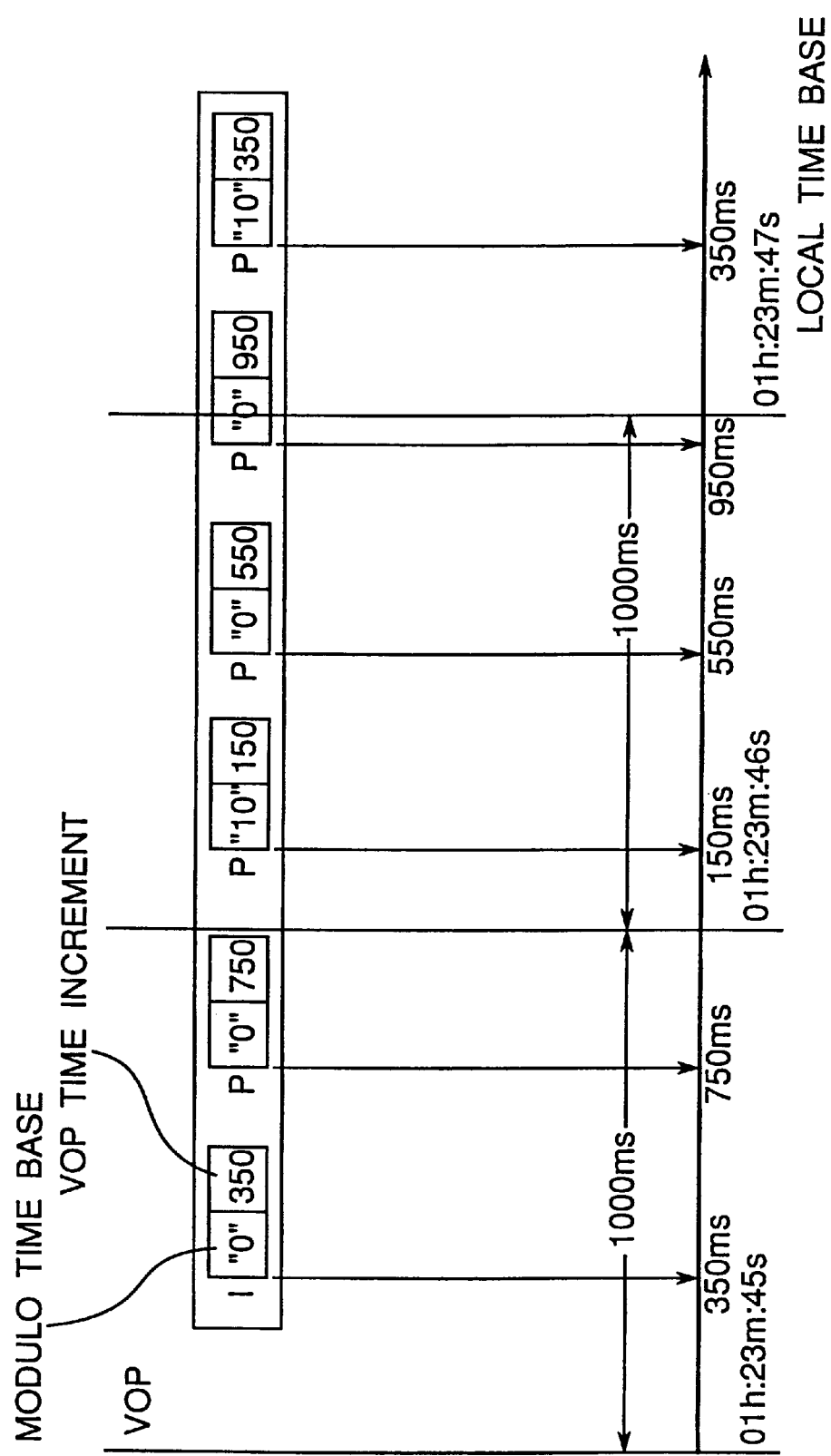
FIG. 3A illustrates the current invention where the temporal reference of the video objects are indicated by the modulo time base and the VOP time increment. Illustration uses I and P VOP only.
Figure 4B:
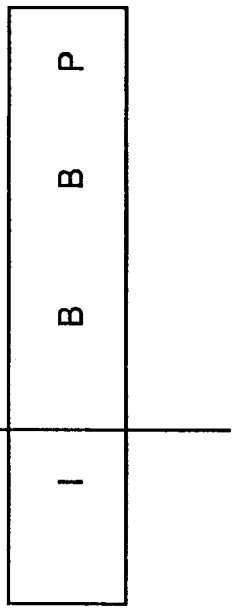
FIG. 4 illustrates an example of the ambiguity that can arise when the presentation order and the encoding order is different as a result of B-video object planes.
Figure 4C:
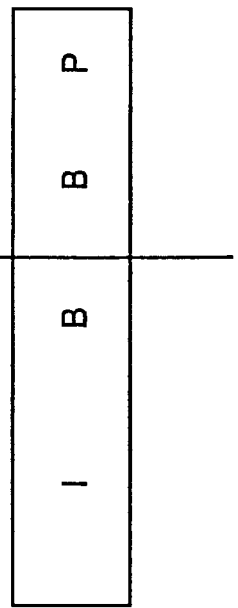
Figure 4D:
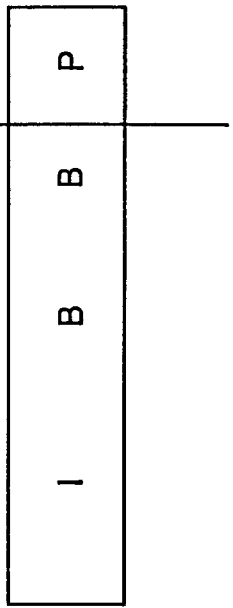
Figure 4A:
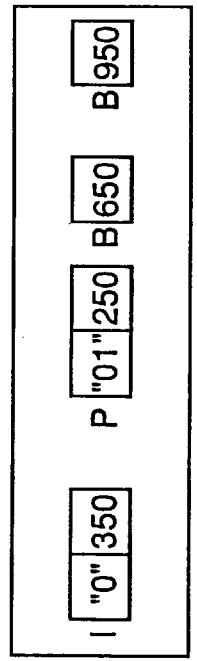

The VOP time increment can then be indicated by a finite length number greater or equal to the ratio of the global time base interval to the local time base resolution. FIG. 3A shows an example of the VOP time increment for I and P-video object planes and the reference to the modulo time base. An absolute time base is used. The VOP time increment is reset each time the modulo time base is encountered. FIG. 3B shows another example using I, P and B-video object planes. The operation is the same with the exception that the modulo time base is repeated in the B-video object planes. If the modulo time base is not repeated in the B-video object plane then ambiguities arise due to the difference in decoding and presentation order. This is described in detail below.

Figure 5B:
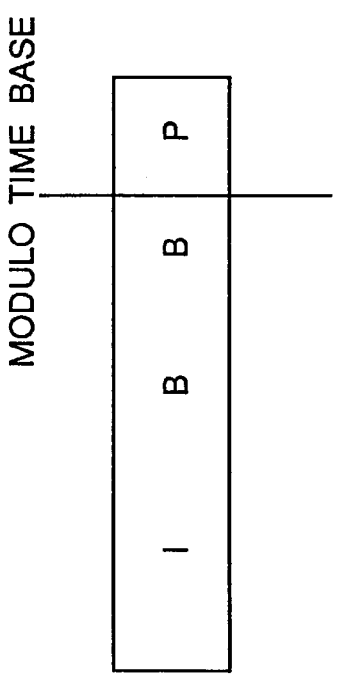
FIG. 5 illustrates a solution to the ambiguity by employing absolute and relative time bases.
Figure 5A:
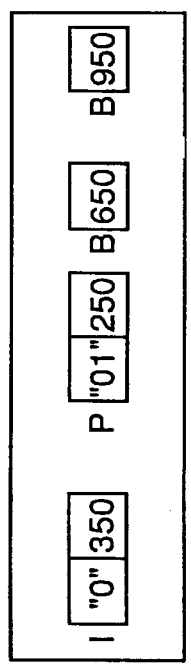

Since the VOP time increment corresponds to the presentation time base, a potential problem will arise when the encoding order is different from presentation order. This occurs with B-video object planes. Similar to MPEG-1 and MPEG-2 B-pictures, B-video object planes are encoded after their reference I and P-video object planes even though they preceded the reference video objects in the presentation order. Since the VOP time increment is finite and is relative to the modulo time base, the VOP time increment is reset when the modulo time base is encountered. However, the order of encoding for the B-video object planes have been delayed. FIG. 4 show the ambiguity that can arise. It is not possible to determine when the VOP time increment should be reset. In fact when given a sequence of encoded events as in FIG. 4A, it is not possible to know which of the timing situations of FIGS. 4B, 4C and 4D it is trying to represent. This problem comes about because of the use of one modulo time base shared among all the different types of video object coupled with the difference between the encoding and presentation order. There is nothing that can be done to the encoding order since the reference information is required by the B-video object planes. It is also not desirable to have independent modulo time base for the different prediction type. Therefore the solution is to code the VOP time increment of the B-video object planes as a relative value to the preceding I or P-video object planes and that the modulo time base applies only to the I and P-video object planes and not the B video object planes. This solution is depicted in FIG. 5.

Next, VOP time offset is described.

Figure 6:
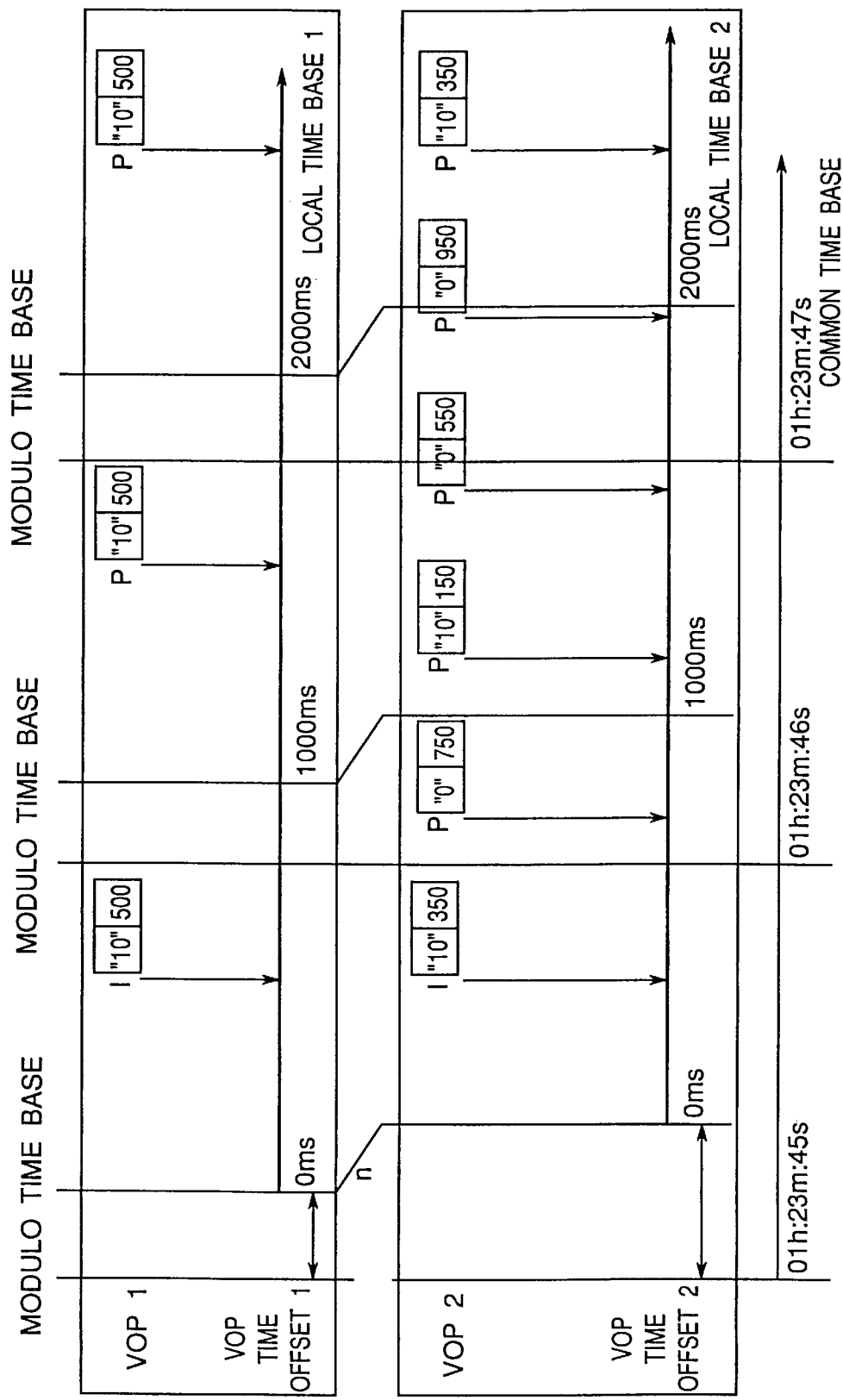
FIG. 6 illustrates the combining of two VOPs and their synchronization to the common time base by employing VOP time offsets.

Besides the above the modulo time base are shared between all video object planes. This means that the synchronization of the different video objects will have a granularity equivalent to the modulo time base interval. This is unacceptable especially in the case where video object planes from different groups are combined to form a new group of video object planes. FIG. 6 shows an example of two different video object planes that were encoded with two different local time base that are offset from one another. Thus when the video object planes are multiplexed, the synchronization of the video objects planes are also offset. A finer granularity is achieved by allowing each individual video object plane to have a VOP time offset. This means that only this value is changed when the video object planes are manipulated and multiplexed. There is no need to change the VOP time increment and yet it is possible to multiplex the different video object planes without coarse granularity timing differentials. FIG. 6 illustrates the use of this time base offsets.

The preferred embodiment of the current invention involves a method of encoding the time base for each of the individual video object plane bitstream, a method of multiplexing different video object planes into a common time base, a method of de-multiplexing the multiplexed bitstream into the components and a method of recovering the time base from the component bitstream.

Encoding the time base is described.

Figure 7:
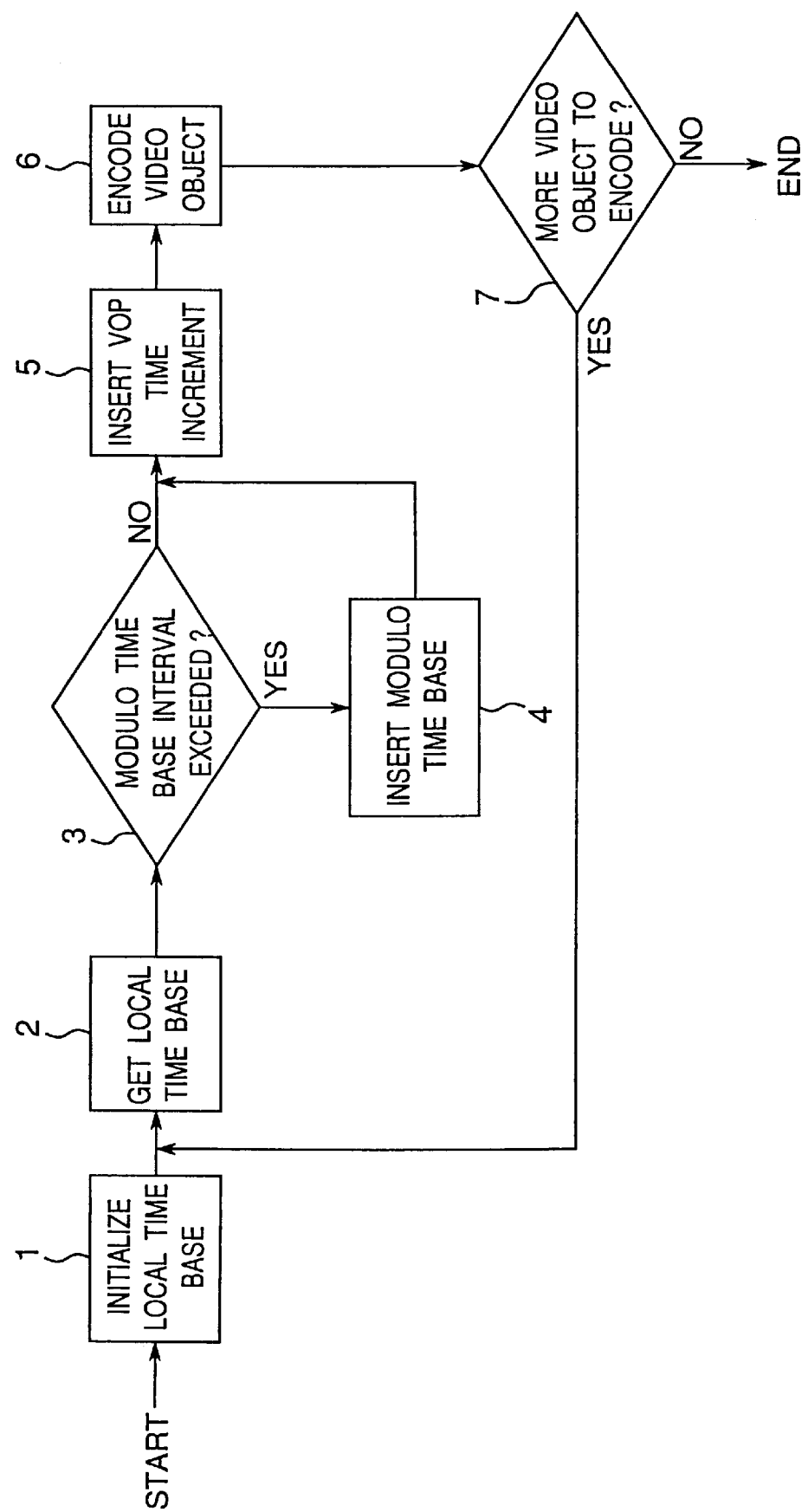
FIG. 7 illustrates the flow diagram for the encoding of the time base.

The flow diagram of the embodiment of the time base encoding is shown in FIG. 7. In the encoder the local time base is first initialized to the local start time in step 1. The process is passed to step 2 where the encoder determines the current value of the local time base. In step 3 the local time base obtained is compared to the previously encoded modulo time base to see if the interval has exceeded the modulo time base interval. If the interval has been exceeded the control is passed to step 4 where the required number of modulo time base is inserted into the bitstream. If the interval has not been exceeded then no special handling is necessary. The processing then proceeds to step 5 where the VOP time increment is inserted into the bitstream. The object is then encoded in step 6 and the inserted into the bitstream. The encoder then checks to determine if there are more objects to be encoded in step 7. If there are more objects to be encoded the process resumes at step 2 where the local time base is obtained. If there are no more objects to be encoded then the process terminates.

The following formula are used to determine the absolute and relative VOP time increments for I/P-video object planes and B-video object planes, respectively.

$$t_{GTBn} = n \times t_{GTBI} + t_{GTB0} (n=0, 1, 2, 3, \ldots) \tag{1}$$

$$t_{AVTI} = t_{TBI/P} - t_{GTBn} \tag{2}$$

$$t_{RVTI} = t_{ETB} - t_{ETBI/P} \tag{3}$$

where $t_{GTBn}$ is the encoder time base marked by the nth encoded modulo time base, $t_{GTBI}$ is the pre-determined modulo time base interval,
$t_{GTB0}$ is the encoder time base start time,
$t_{AVTI}$ is the absolute VOP time increment for the I or P-video object planes,
$t_{ETBI/P}$ is the encoder time base at the start of the encoding of the I or P video object planes,
$t_{RVTI}$ is the relative VOP time increment for the B-video object planes, and
$t_{ETBB}$ is the encoder time base at the start of the encoding of the B video object plane.

Next, multiplexing more than one video object planes is described.

Figure 8:
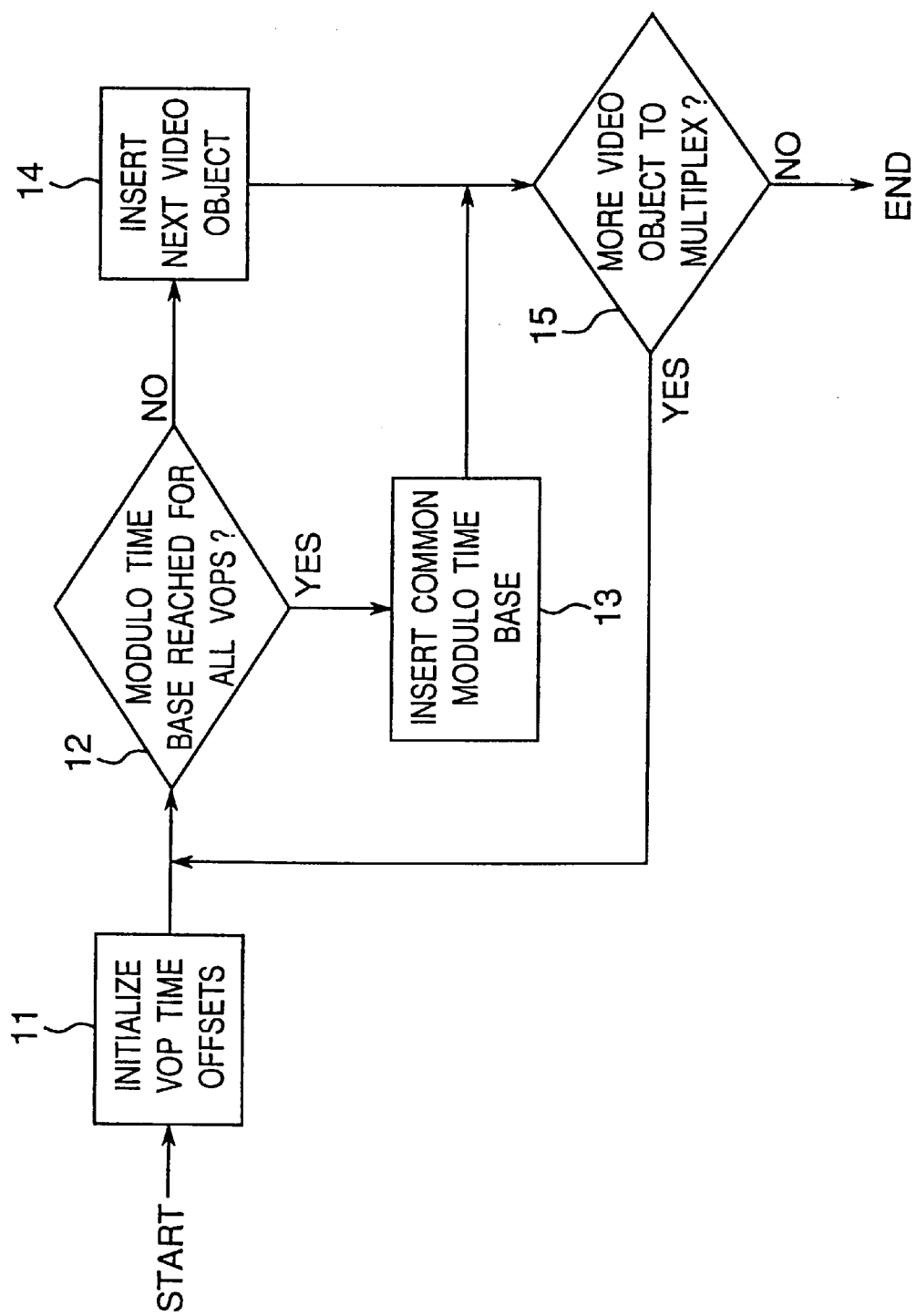
FIG. 8 illustrates the flow diagram for the multiplexing of more than one video object planes.

When more than one video object planes are multiplexed together, the multiplexer examines the multiple video object plane bitstreams to determine the order of multiplexing as well as the synchronization. The operations involved is depicted in FIG. 8. The VOP time offsets for each of the video object planes to be multiplexed are inserted into the bitstream in step 11. All the bitstreams of the video object planes to be multiplexed are then examined in step 12 to determine if all of the planes are at their respective modulo time base. If they are then the processing is passes to step 13 where a common modulo time base is inserted into the multiplexed bitstream. The processing then proceeds to step 14, where the next encoded video object is inserted into the multiplexed bitstream. In step 15 the bitstreams of the video object planes to be multiplexed are again examined to see if there are more video objects to be multiplexed. If there is, then the control is passed to step 12 again. Otherwise the process ends.

De-multiplexing the bitstream containing more than one video object planes is described.

Figure 9:
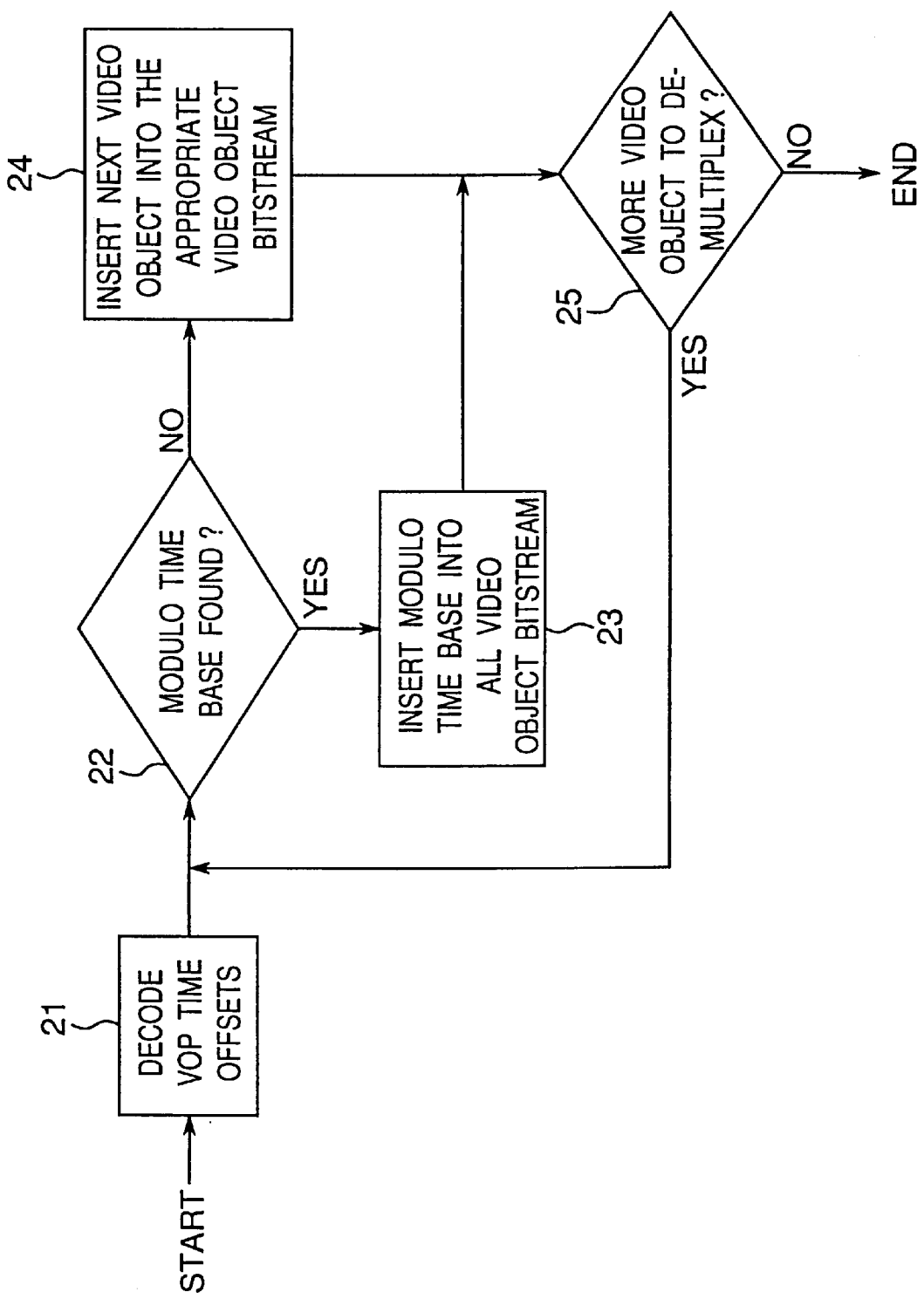
FIG. 9 illustrates the flow diagram for the de-multiplexing of more than one video object planes.

The de-multiplexing of the bitstream containing multiple video object planes is depicted in FIG. 9. The process begins in step 21 where the VOP time offsets are decoded and passed to the decoders for synchronization. Then the multiplexed bitstream is examined in step 22 to see if the modulo time base is found. If the modulo time base is found then the process is passed to step 23 where the modulo time base is inserted into all the video object bitstreams. The processing then continues with step 24 where the next video object is examined and inserted into the appropriate video object bitstream. Finally the multiplexed bitstream is examined again to see if there is any more video object to de-multiplex. If there is, then the process is passed to step 22 again. Otherwise the process ends.

Recovering the time base is described.

Figure 10:
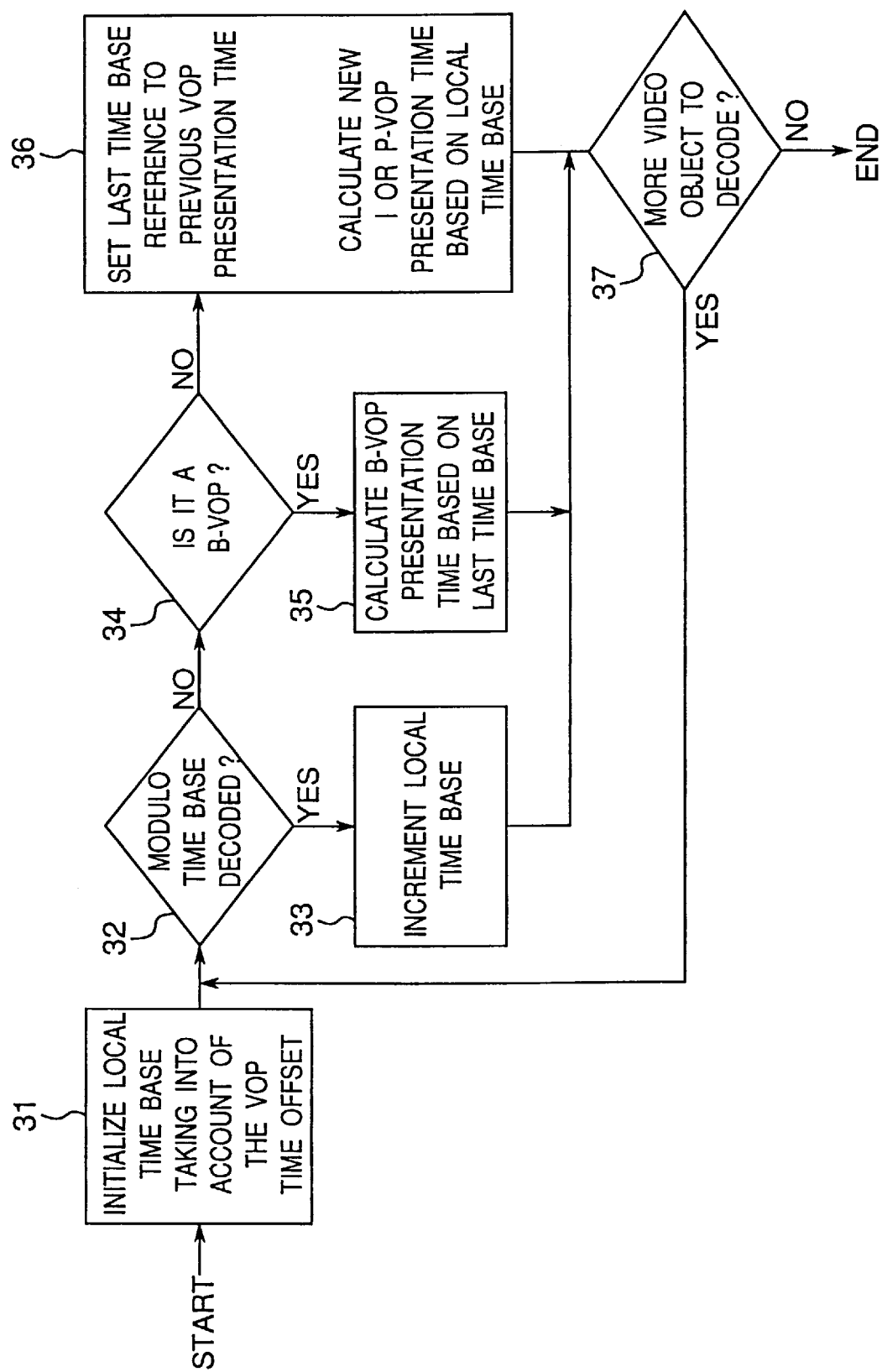
FIG. 10 illustrates the flow diagram for the recovery of the presentation time stamp.

The embodiment of the time base recovery is shown in FIG. 10. In recovering the local time base, the process begins in step 31 where the local time based is initialized taking into account of the VOP time offset decoded by the de-multiplexer. Then the process is passed to step 32 which checks the bitstream to determine if the modulo time base is decoded. If the modulo time base is decoded then the process is passed to step 33 where the local time base is incremented by the modulo time base increment. The process is then passed to step 37. If the modulo time base is not decoded then the process is passed to step 34 where the video object is examine to determine if it is a B-video object or not. If it is then the process is passed to step 35 where the B-video object decoding time base is calculated based on equation (6). The process is then passed to step 37. If the result of step 34 is not a B-video object then the process is passed to step 36 where the decoding time base is calculated based on equation (5). The process then proceeds to step 37. In step 37, the bitstream is examine to see if there is more video objects to decode. If there is then the process is passed to step 32 again. Otherwise the processing ends.

The following formula are used to determine the presentation time stamp of the video objects:

$$t_{GTBn} = n \times t_{GTBI} + t_{GTB0} \quad (n=0, 1, 2, 3, \ldots) \quad (4)$$

$$t_{DTBI/P} = t_{AVTI} + t_{GTBn} \quad (5)$$

$$t_{DTBB} = t_{RVTI} + t_{DTBI/P} \quad (6)$$

where
$t_{GTBn}$ is the decoding time base marked by the nth decoded modulo time base,
$t_{GTBI}$ is the pre-determined modulo time base interval,
$t_{GTB0}$ is the decoding time base start time,
$t_{DTBI/P}$ is the decoding time base at the start of the decoding of the I or P video object planes,
$t_{AVTI}$ is the decoded absolute VOP time increment for the I or P-video object planes,
$t_{DTBB}$ is the decoding time base at the start of the decoding of the B video object plane, and
$t_{RVTI}$ is the decoded relative VOP time increment for the B-video object planes.

Implementation of the Bitstream Encoder is described.

Figure 11:
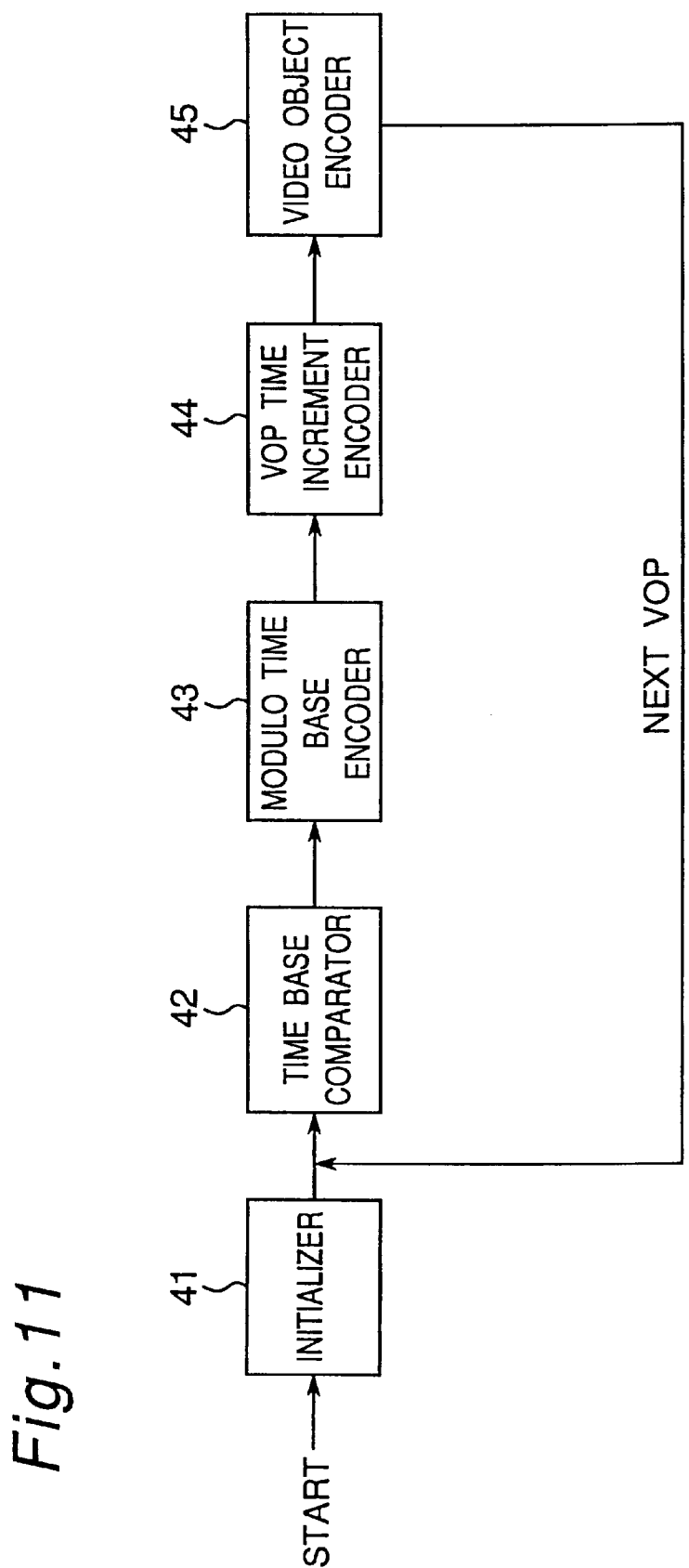
FIG. 11 illustrates the block diagram for the operations of the bitstream encoder for encoding of the time base.

FIG. 11 shows the block diagram for an implementation of the bitstream encoder for encoding the modulo time base and the VOP time increment. For the purpose of this illustration the example in FIG. 3B is used. Since bi-directional prediction is used, the encoding order is different from the presentation order shown in FIG. 3B. The encoding order begins with the I-VOP followed by the P-VOP before the B-VOP. This is illustrated in the three paragraphs below.

The process begins in the initializer, step 41 where the bitstream encoder starts by initializing the local time base register to the initial value of the time code. The same time code value is encoded into the bitstream. At the start of the encoding of the next I-VOP the time code comparator, step 42, compares the presentation time of the I-VOP against the local time base register. The result is passed to the modulo time base encoder, step 43. The modulo time base encoder will insert into the bitstream the required number of "1" equivalent to the number of modulo time base increment that has elapsed. This is then followed by the symbol "O" to signal the end of the modulo time base code. The local time base register is updated to the current modulo time base. The processing then proceed to the VOP time base increment encoder, step 44, where the remainder of the presentation time code of the I-VOP is encoded.

The process then repeats with the next encoded video object plane which is the P-VOP. The time code comparator, step 42, compares the presentation time of the P-VOP against the local time base register. The result is passed to the modulo time base encoder, step 43. The modulo time base encoder will insert the required number of "1" equivalent to the number of modulo time base increment that has elapsed. This is then followed by the symbol "O" to signal the end of the modulo time base code. The B-VOP time base register is set to the value of the local time base register and the local time base register is updated to the current modulo time base. The processing then proceeds to the VOP time base increment encoder, step 44, where the remainder of the presentation time code of the P-VOP is encoded.

The process then repeats with the next encoded video object plane which is the B-VOP. The time code comparator, step 42, compares the presentation time of the B-VOP against the B-VOP time base register. The result is passed to the modulo time base encoder, step 43. The modulo time base encoder will insert the required number of "1" equivalent to the number of modulo time base increment that has elapsed. This is then followed by the symbol "O" to signal the end of the modulo time base code. Both the B-VOP time base register and the local time base register are not changed after the processing of the B-VOP. The processing then proceed to the VOP time base increment encoder, step 44, where the remainder of the presentation time code of the B-VOP is encoded.

The local time base register is reset at the next I-VOP which marks the beginning of the next group of VOP.

Implementation of the Bitstream Decoder is described.

Figure 12:
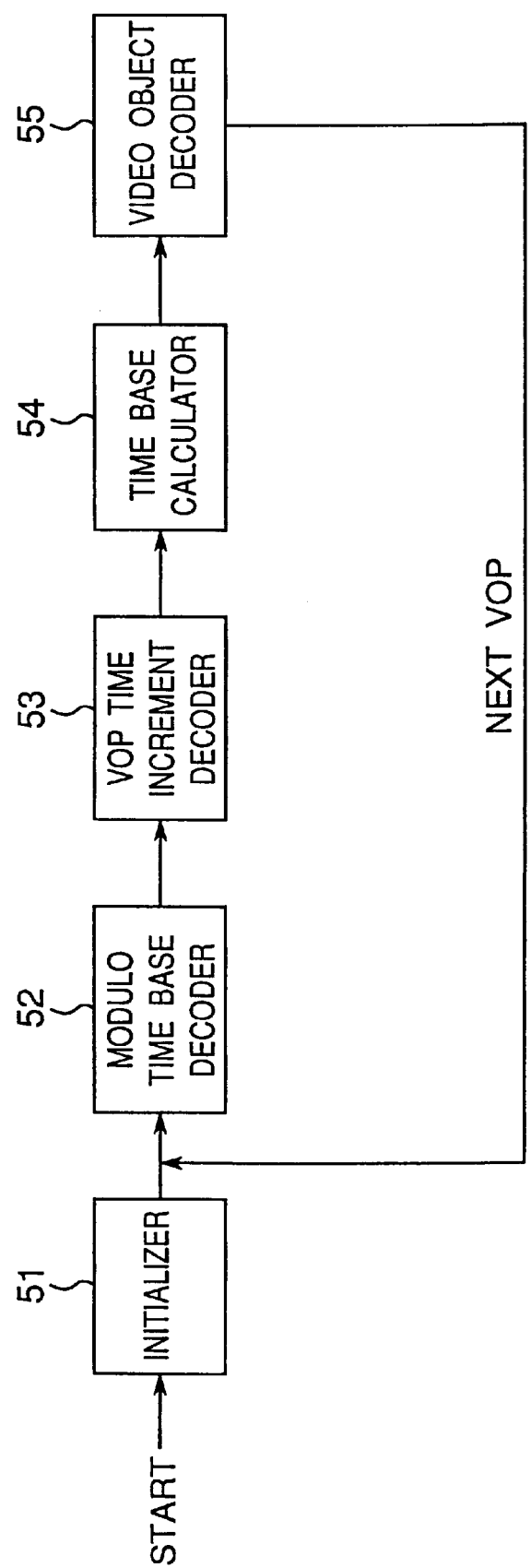
FIG. 12 illustrates the block diagram for the operations of the bitstream decoder for decoding of the time base.

FIG. 12 illustrates the block diagram for the implementation of the decoder for the modulo time base and VOP time increment to recover the presentation time stamp. As in the implementation of the encoder the example in FIG. 3B is used. The decoding order is the same as the encoding order where the I-VOP is decoded followed by the P-VOP before the B-VOP. This is explained in the paragraphs below.

The processing begins in the initializer, step 51, where the local time base register is set to the value of the time code decoded from the bitstream. The processing then proceeds the modulo time base decoder, step 52, where the modulo time base increment is decoded. The total number of modulo time base increment decoded is given by the number of "1" decoded before the symbol "0" Next the VOP time base increment is decoded in the VOP time base increment, step 53. In the time base calculator, step 54, the presentation time of the I-VOP is recovered. The total decoded modulo time base increment value is added to the local time base register. The VOP time base increment is then added to the local time base register to obtain the presentation time of the I-VOP. The process then goes to the video object decoder where the video object is decoded.

For the P-VOP, the process repeats in the modulo time base decoder, step 52, where the modulo time base increment is decoded. The total number of modulo time base increment decoded is given by the number of "1" decoded before the symbol "O". Next the VOP time base increment is decoded in the VOP time base increment, step 53. In the time base calculator, step 54, the presentation time of the P-VOP is recovered. The B-VOP modulo time base register is set to the value in the local time base register. The total decoded modulo time base increment value is added to the local time base register. The VOP time base increment is then added to the local time base register to obtain the presentation time of the P-VOP. The process then goes to the video object decoder where the video object is decoded.

For the B-VOP, the process repeats in the modulo time base decoder, step 52, where the modulo time base increment is decoded. The total number of modulo time base increment decoded is given by the number of "1" decoded before the symbol "O". Next the VOP time base increment is decoded in the VOP time base increment, step 53. In the time base calculator, step 54, the presentation time of the B-VOP is recovered. The total decoded modulo time base increment value and the VOP time base increment is added to the B-VOP time base register to obtain the presentation time of the B-VOP. Both the B-VOP time base register and the local time base register are left unchanged The process then goes to the video object decoder where the video object is decoded.

The local time base register is reset at the next I-VOP which marks the beginning of the next group of VOP.

Specific example is described.

Figure 13:
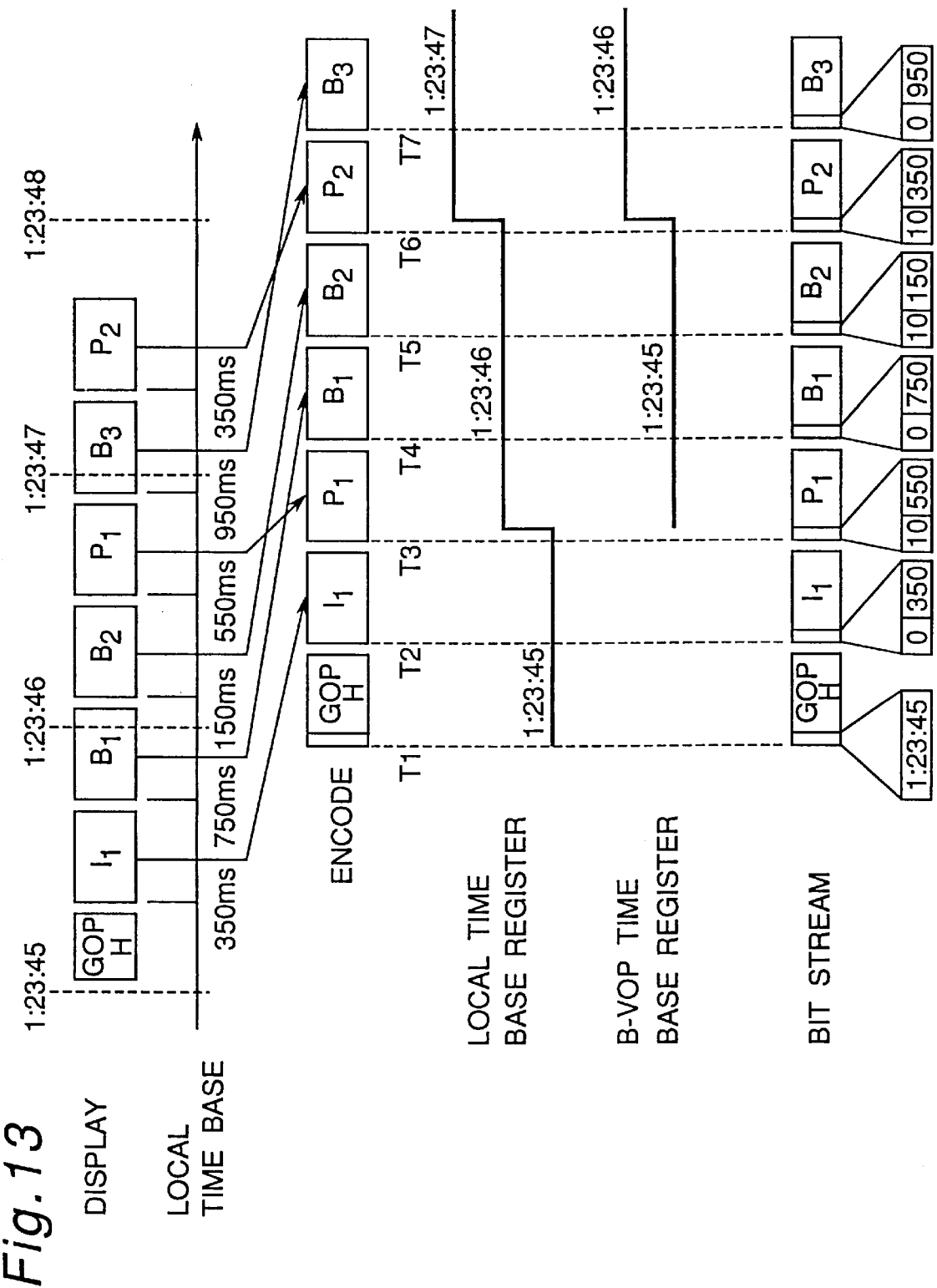
FIG. 13 illustrates the time chart for forming a bitstream data.

Referring to FIG. 13, an example of the steps for encoding the compressed data into bitstream data is shown. As shown in the top row in FIG. 13, the compressed video data VOPs are aligned in the display order, I1, B1, B2, P1, B3, P3 with a GOP (group of pictures) header inserted at the beginning of group of VOPs. While being displayed, the local time, at which the display is effected, is measured for each VOP using the local time clock. For example, the first VOP (I1-VOP) is displayed at 1 hour 23 minute 45 second 350 millisecond (1:23:45:350) counted from the very beginning of the video data; the second VOP (B1-VOP) is displayed at 1:23:45:750; the third VOP (B2-VOP) is displayed at 1:23:46:150; and so on.

For encoding the VOPs, it is necessary to insert the display time data to each VOP. The insertion of the full time data including hour, minute, second and millisecond occupies a certain data space in the header portion of each VOP. The aim of the present invention is to reduce such a data space and to simplify the time data to be inserted in each VOP.

Each of the VOPs shown in the first row in FIG. 13 is stored with the display time data of millisecond at the VOP time increment area. Each of the VOPs in the first row is also stored temporarily with the display time data of hour, minute and second. The GOP header is stored with the display data of hour, minute and second for the first VOP (I1-VOP).

As shown in the second row in FIG. 13, the VOPs are delayed by a predetermined time using a buffer (not shown). When the VOPs are produced from the buffer, the order of the VOPs are changed according to the bi-directional prediction rule such that the bi-directional VOP, i.e., B-VOP, should be positioned after the P-VOP to which the B-VOP references. Thus, the VOPs are aligned in the order of I1, P1, B1, B2, P2, B3.

As shown in the third row in FIG. 13, at time T1, i.e., when the GOP header is being encoded, the local time base register stores the hour, minute, second data as stored in the GOP header. In the example shown in FIG. 13, the local time base register stores 1:23:45. Then, before time T2, the bitstream data for the GOP header is obtained with the hour, minute, second data being inserted as shown at the bottom row in FIG. 13.

Then, at time T2, the first VOP (I1-VOP) is taken up. The time code comparator compares the time (hour, minute, second) stored in the local time base register with the time (hour, minute, second) temporarily stored in the first VOP (I1-VOP). According to the example, the result of the comparison is the same. Thus, the comparator produces "0" indicating that the first VOP (I1-VOP) occurs in the same second as the second being held in the local time base register. The result "0" as produced from the comparator is added to the first VOP (I1-VOP) at the modulo time base area. At the same time, the hour, minute and second data temporarily stored in the first VOP (I1-VOP) is eliminated. Thus, before time T3, the bitstream data for the first VOP (I1-VOP) is obtained with "0" inserted in the modulo time base area and "350" inserted in the VOP time increment area.

Then, at time T3, the second VOP (P1-VOP) is taken up. The time code comparator compares the time (hour, minute, second) stored in the local time base register with the time (hour, minute, second) temporarily stored in the second VOP (P1-VOP). According to the example, the result of the comparison is such that the time temporarily stored in the second VOP (P1-VOP) is one second greater than the time stored in local time base register. Thus, the comparator produces "10" indicating that the second VOP (P1-VOP) occurs in the next one second to the second being held in the local time base register. If the second VOP (P1-VOP) occurs in the next—next second to the second being held in the local time base register, the comparator will produce "110".

After time T3, the B-VOP time base register is set to the time equal to the time carried in the local time base register immediately before time T3. In the example, the B-VOP time base register is set to 1:23:45. Also, after time T3, the local time base register is incremented to the time equal to the time temporarily stored in the second VOP (P1-VOP). Thus, in the example, the local time base register is incremented to 1:23:46.

The result "10" as produced from the comparator is added to the second VOP (P1-VOP) at the modulo time base area. At the same time, the hour, minute and second data temporarily stored in the second VOP (P1-VOP) is eliminated. Thus, before time T4, the bitstream data for the second VOP (P1-VOP) is obtained with "10" inserted in the modulo time base area and "550" inserted in the VOP time increment area.

Then, at time T4, the third VOP (B1-VOP) is taken up. The time code comparator compares the time (hour, minute, second) stored in the B-VOP time base register with the time (hour, minute, second) temporarily stored in the third VOP (B1-VOP). According to the example, the result of the comparison is the same. Thus, the comparator produces "0" indicating that the third VOP (B1-VOP) occurs in the same second as the second being held in the B-VOP time base register. The result "0" as produced from the comparator is added to the third VOP (B1-VOP) at the modulo time base area. At the same time, the hour, minute and second data temporarily stored in the third VOP (I1-VOP) is eliminated. Thus, before time T5, the bitstream data for the third VOP (B1-VOP) is obtained with "0" inserted in the modulo time base area and "750" inserted in the VOP time increment area.

Then, at time T5, the fourth VOP (B2-VOP) is taken up. The time code comparator compares the time (hour, minute, second) stored in the B-VOP time base register with the time (hour, minute, second) temporarily stored in the fourth VOP (B2-VOP). According to the example, the result of the comparison is such that the time temporarily stored in the fourth VOP (B2-VOP) is one second greater than the time stored in B-VOP time base register. Thus, the comparator produces "10" indicating that the fourth VOP (B2-VOP) occurs in the next one second to the second being held in the B-VOP time base register.

During the processing of the B type VOP, neither the local time base register nor the B-VOP time base register is incremented regardless of whatever result the comparator produces.

The result "10" as produced from the comparator is added to the fourth VOP (B2-VOP) at the modulo time base area. At the same time, the hour, minute and second data temporarily stored in the fourth VOP (B2-VOP) is eliminated. Thus, before time T6, the bitstream data for the fourth VOP (B2-VOP) is obtained with "10" inserted in the modulo time base area and "150" inserted in the VOP time increment area.

Then, at time T6, the fifth VOP (P2-VOP) is taken up. The time code comparator compares the time (hour, minute, second) stored in the local time base register with the time (hour, minute, second) temporarily stored in the fifth VOP (P2-VOP). According to the example, the result of the comparison is such that the time temporarily stored in the fifth VOP (P2-VOP) is one second greater than the time stored in local time base register. Thus, the comparator produces "10" indicating that the fifth VOP (P2-VOP) occurs in the next one second to the second being held in the local time base register.

After time T6, the B-VOP time base register is incremented to the time equal to the time carried in the local time base register immediately before time T6. In the example, the B-VOP time base register is incremented to 1:23:46. Also, after time T6, the local time base register is incremented to the time equal to the time temporarily stored in the fifth VOP (P2-VOP). Thus, in the example, the local time base register is incremented to 1:23:47.

The result "10" as produced from the comparator is added to the fifth VOP (P2-VOP) at the modulo time base area. At the same time, the hour, minute and second data temporarily stored in the fifth VOP (P2-VOP) is eliminated. Thus, before time T4, the bitstream data for the fifth VOP (P2-VOP) is obtained with "10" inserted in the modulo time base area and "350" inserted in the VOP time increment area.

Thereafter, a similar operation is carried out for forming bitstream data for the following VOPs.

For decoding the bitstream data, an operation opposite to the above is carried out. First, the time (hour, minute, second) carried in the GOP header is read. The read time is stored in the local time base register.

Upon receipt of the I type or P type VOP, i.e., other then the B type VOP, the data stored in the modulo time base area is read. If the read data is "0", i.e., without any is in front of 0, no change is made in the local time base register, and also no change is made in the B-VOP time base register. If the read data is "10", the time stored in the local time base register is incremented by one second. If the read data is "110", the time stored in the local time base register is incremented by two seconds. In this manner, the number of seconds which should be incremented is determined by the number of is inserted in front of 0. Also, when the read data is "10" or "110", the B-VOP time base register, which is a memory, copies the time the local time base register had carried just before the most recent increment. Then, the time (hour, minute, second) carried in the local time base register is combined with the time (millisecond) carried in the VOP time increment area to establish a specific time at which the I type or P type VOP should occur.

Upon receipt of the B type VOP, the data stored in the modulo time base area is read. If the read data is "0", the time (hour, minute, second) carried in the B-VOP VOP time base register is combined with the time (millisecond) carried in the VOP time increment area to establish a specific time at which the B type VOP should occur. If the read data is "10", the time (hour, minute, second) carried in the B-VOP time base register is added one second, and then the added result time is combined with the time (millisecond) carried in the VOP time increment area to establish a specific time at which the B type VOP should occur. If the read data is "110", the time (hour, minute, second) carried in the B-VOP time base register is added two seconds, and then the added result time is combined with the time (millisecond) carried in the VOP time increment area to establish a specific time at which the B type VOP should occur.

The effects of this invention is to enable video object planes encoded by different encoders to be multiplexed. It will also facilitate object based bitstream manipulation of compressed data that come from different sources to create new bitstreams. It provides a method of synchronization for audio visual objects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of encoding a local time base of an audio visual sequence in the compressed data comprising the steps of:

obtaining instances of the audio visual sequence by temporal sampling;

determining the local time base of the said instances to be encoded into compressed data;

encoding the said local time base in two parts, comprising of a modulo time base that marks the occurrence of a set of time reference spaced evenly at a specific interval on the local time base and a time base increment relative to the said evenly spaced time reference;

inserting the modulo time base into the compressed data whenever the specific interval have elapsed; and inserting the time base increment within the compressed data of the said instances of the audio visual sequence.

2. A method of claim 1, wherein a plurality of compressed bitstreams containing local time base information encoded therein are multiplexed and de-multiplexed, for de-multiplexing further comprising the steps of:

decoding the time base offset of the individual compressed bitstream;

examining the multiplexed bitstream for the next compressed instance and placing the said instance into the appropriate compressed bitstream until a modulo time base is encountered in the multiplexed bitstream;

inserting a modulo time base to each of the compressed bitstreams; and repeating the last two steps until the multiplexed bitstream is exhausted.

3. A method of decoding a local time base of an audio visual sequence from the time base of the compressed data encoded according to claim 1 comprising the steps of:

initializing the reference time base taking into account the time base offset;

incrementing the reference time base by a specific interval for each modulo time base decoded;

decoding the time base increment of the compressed instance; and determining the decoding time base of the said instance by adding the said decoded time base increment value to the reference time base.

4. A method of encoding the time base according to claim 1 where the local time base, time base increment and time base offsets are in units of milliseconds and the specific interval has a duration of 1000 milliseconds.

5. A method of claim 1, wherein a plurality of compressed bitstreams containing local time base information encoded therein are multiplexed, for multiplexing further comprising the steps of:

synchronizing the local time base of the individual compressed bitstream to a common time base by encoding and inserting the time base offset in the multiplexed bitstream;

examining each of the compressed bitstream for the next compressed instance to be placed into the multiplexed bitstream until all the compressed bitstreams have arrived at the modulo time base;

inserting a common modulo time base into the multiplex bitstream and skipping the modulo time base of the compressed bitstreams; and repeating the last two steps until all compressed bitstreams are exhausted.

6. A method of multiplexing a plurality of compressed bitstreams as in claim 5 where the individual compressed bitstreams are themselves multiplexed bitstreams.

7. A method of encoding a local time base of an audio visual sequence in the compressed data comprising the steps of:

obtaining instances of the audio visual sequence by temporal sampling;

determining the local time base of the said instances to be encoded into compressed data;

encoding the said instances in one of two methods comprising of a first method of compression without reference to any future instances and a second method of compression which refers to the future reconstructed instance;

encoding the said local time base in two parts, comprising of a modulo time base that marks the occurrence of a set of time reference spaced evenly at a specific interval on the local time base and a time base increment;

encoding the time base increment for the instance compressed using the first compression method as an absolute value relative to the said evenly spaced time reference;

encoding the time base increment for the instance compressed using the second compression method as a relative value to the local time base of the previously compressed instance using the said first method;

inserting the modulo time base into the compressed data whenever the specific interval have elapsed; and inserting the time base increment within the compressed data of the said instances of the audio visual sequence.

8. A method of decoding a local time base of an audio visual sequence from the time base of the compressed data encoded according to claim 7 comprising the steps of initializing the reference time base taking into account of the time base offset;

incrementing the reference time base by a specific interval for each modulo time base decoded;

decoding the time base increment of the compressed instance; and determining the time base increment to be one of two types, absolute or relative, depending on the first or second compression method used in the encoding of the instance, respectively;

determining the decoding time base of the said instance by adding the said decoded time base increment value to the reference time base if the time base is of the first type; and determining the decoding time base of the said instance by adding the said decoded time base increment value to the decoding time base of the previous instance encoded using the first compression method, if the time base increment is of the second type.

* * * * *